J. F. MAHON.
PORTABLE SNOW PLOW FOR ATTACHING TO AUTOMOBILES OR OTHER VEHICLES.
APPLICATION FILED DEC. 27, 1917.
1,262,966.   Patented Apr. 16, 1918.
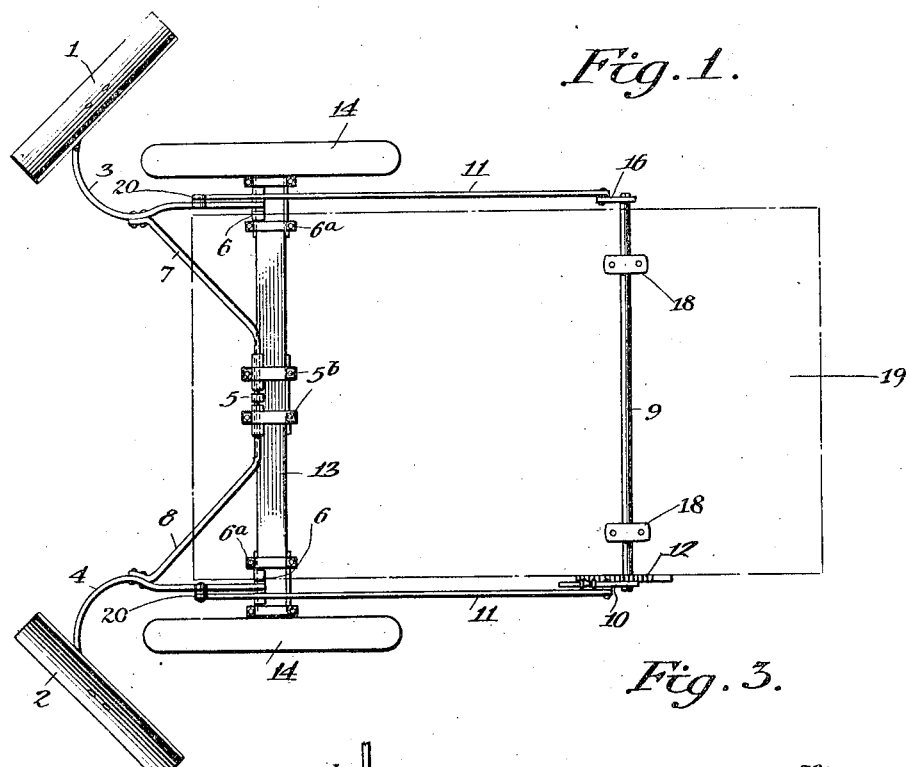
Fig. 1.
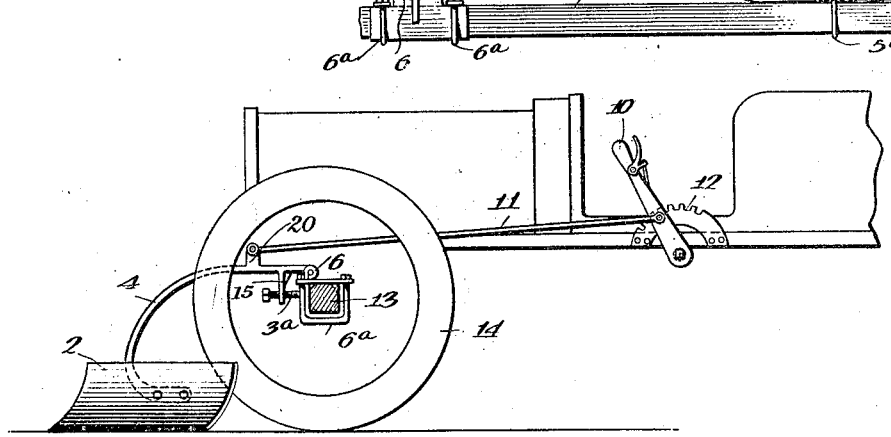
Fig. 3.
Fig. 2.
Witnesses:
Inventor:
James F. Mahon
by David H. Sibbett
Attorney.

UNITED STATES PATENT OFFICE.

JAMES F. MAHON, OF PRINCETON, OREGON.

PORTABLE SNOW-PLOW FOR ATTACHING TO AUTOMOBILES OR OTHER VEHICLES.

1,262,966.　　　　Specification of Letters Patent.　　Patented Apr. 16, 1918.

Application filed December 27, 1917. Serial No. 208,993.

*To all whom it may concern:*

Be it known that I, JAMES F. MAHON, a citizen of the United States, and a resident of Princeton, in the county of Harney and State of Oregon, have invented a new and Improved Portable Snow-Plow for Attaching to Automobiles or other Vehicles, of which the following is a full, clear, and exact description.

This invention relates to snow plows especially designed for clearing the snow from the street or road in front of an automobile or other vehicle carrying said universal snow plow.

It is especially adapted to be applied to the front axle of any automobile with slight variations to suit the make of automobile, and is hereafter described in connection with an automobile, although readily adapted for use in connection with any other vehicle.

When applied to an automobile the snow plow may be raised or lowered in position before the front wheels and when let down in place and the automobile is in motion the snow plow pushes, scrapes, and throws the snow away to the right and left of each front wheel.

The invention has for its general objects the providing of a comparatively simple, inexpensive, substantial, universal snow plow, which is so designed that it can be securely and firmly held in position on an automobile and yet be easily raised and readily detached.

It is equipped with suitable connecting means whereby the same is attached to the axle and body of the automobile.

A further object of the invention is to provide a snow plow attachment of simple form, which at the same time acts as a bumper, thereby protecting the automobile from injury in case of contact with any object.

The snow plow shares may be extended to meet in the center if desired depending considerably on the make and power of the automobile upon which used and the condition of the roads or streets.

With such objects in view, the invention comprises various novel features of construction and arrangement of parts which will be set forth with more particularity in the following description and claims appended hereto, reference being made to the drawing as a part of this specification.

In the accompanying drawing, which illustrates the invention and wherein similar characters of reference indicate corresponding parts in all the views:

Figure 1 is a bottom view of the snow plow attached to an automobile;

Fig. 2 is a side view of the snow plow; and

Fig. 3 is a detailed view showing the method of attachment to the axle.

Referring to the drawing, Fig. 1 shows the bottom 19 of an automobile with the snow plow attached to the axle 13 upon which axle are mounted the front wheels 14 of the automobile. The share 1 is rigidly attached to plow beam or frame 3, and the share 2 is rigidly attached to plow beam or frame 4. These plow beams hang on similar hinges 6 suitably attached to the axle 13 by means of clamps 6$^a$, more clearly shown in Fig. 3. Each plow beam, 3 and 4, is provided with two short arms 15 and 20 as a part thereof. The two short arms 15 are each provided with a tapped hole through which a large thumb screw bolt 3$^a$ is inserted as illustrated in Fig. 2. The thumb screw bolts 3$^a$ may be set at whatever depth desired within their limits, thus regulating the height of the plow shares 1 and 2 when let down in position. These thumb screw bolts butt against axle 13 and so hold the plow beams 3 and 4 firmly in position.

A connecting rod 11, Fig. 2 is movably attached at one end to arm 20 provided on plow beam 4, and the other end is movably attached to controlling lever 10. On the opposite side of the automobile, a similar connecting rod 11, Fig. 1, is movably attached at one end to arm 20 provided on plow beam 3, and the other end is movably attached to connecting lever 16, said lever 16 is attached in turn on main shaft 9.

Each plow beam or frame 3 and 4 is also provided with a brace 7 and 8, Fig. 1, respectively. One end of each brace is rigidly attached to the respective plow beams by bolts and nuts or other appropriate means. The other end of each brace is rounded and is held in place on axle 13 by clamps 5$^b$, which clamps are attached to axle 13 by means of bolts and nuts or other appropriate means. Between the ends of the braces attached to axle 13 a key piece 5 is provided. The ends of the key piece 5 are concave. The rounded ends of braces 7 and 8 are inserted into the concave ends of the key piece 5, and when thus inserted and held in place by clamps 5ᵇ a rotary motion of said braces 7 and 8 is allowed.

A main shaft 9, Fig. 1, with each end thereof squared and provided with a screw thread, passes under the bed 19 of the automobile. Main shaft 9 is attached to the bed 19 of the automobile by clamps 18 in such a manner as to permit a rotary motion only. A short lever 16, provided with a square hole, fits over one squared end of main shaft 9, and the controlling lever 10, also provided with a square hole, fits over the other end of main shaft 9; both levers being held in place by means of similar screw taps or caps on the ends of said main shaft 9.

It is thus seen that any motion of controlling lever 10 backward or forward will produce resultant motion of plow beams 3 and 4, and so raise or lower the same. Controlling lever 10 may be placed on either side of the automobile depending on whether the automobile is right or left hand driven.

A ratchet piece 12, Fig. 2, is suitably attached to the automobile. Controlling lever 10 is provided with a release lever which catches in ratchet piece 12 and so holds said controlling lever in place. Controlling lever 10 is also a safety device for raising the plow shares when necessary to avoid striking any obstacle. Shares 1 and 2 are made preferably of metal of suitable gage, slightly concave if desired.

It is seen that this device may be readily attached to any automobile or truck with slight changes in the adjustment and connecting means. It is simple, yet substantial, in construction, and varies materially from other snow plows heretofore patented.

Having now fully described my invention, what I claim and desire to secure by Letters Patent is:

1. A snow plow, in combination with an automobile, two frames each provided with two arms, a share attached to each frame, each frame carrying a brace frame, hinge means attached to each frame, lever means for raising and lowering said frames, means for attaching said hinge means to the axle, means for preventing said frames from dropping beyond a desired point, means for attaching said brace frames to the axle, and a key piece provided with concave ends permitting rotary movement of said brace frames, substantially as described.

2. In a snow plow, in combination with a wheeled vehicle, two frames each carrying a share, a plurality of detachable hinges, detachable means for attaching said hinges to the front axle of the vehicle and to said frames, a brace frame attached to each of said frames, clamp means holding each brace frame in place on axle, a key attachment permitting turning movement of the ends of said brace frames but opposing other movement, a thumb screw bolt fastened to each frame to prevent said frames from falling beyond a fixed point, a lever suitably connected with said frames for raising and lowering the same, means for catching and holding said lever, and means for attaching said means to the bed of the vehicle, substantially as described.

JAMES F. MAHON.

Witnesses:
 ARCHIE McGOWAN,
 CHARLES W. ELLIS.